No. 621,470.  
C. N. DUTTON.  
AQUEDUCT.  
(Application filed Oct. 7, 1897.)  
(No Model.)  
Patented Mar. 21, 1899.  
11 Sheets—Sheet 1.

WITNESSES:  
Jules P. Metzger  
T. J. Hogan

INVENTOR  
Chauncey N. Dutton,  
by J. Snowden Bell,  
atty.

No. 621,470. Patented Mar. 21, 1899.
C. N. DUTTON.
AQUEDUCT.
(Application filed Oct. 7, 1897.)

(No Model.) 11 Sheets—Sheet 2.

WITNESSES: Jules T. Metzger, T. J. Hogan.

INVENTOR Chauncey N. Dutton, by J. Snowden Bell, atty.

No. 621,470. Patented Mar. 21, 1899.
C. N. DUTTON.
AQUEDUCT.
(Application filed Oct. 7, 1897.)
(No Model.) 11 Sheets—Sheet 3.

WITNESSES:
Jules P. Metzger
T. J. Hogan.

INVENTOR
Chauncey N. Dutton,
By J. Snowden Bell
atty.

THE NORRIS PETERS CO., PHOTO-LITHO., WASHINGTON, D. C.

No. 621,470. Patented Mar. 21, 1899.
C. N. DUTTON.
AQUEDUCT.
(Application filed Oct. 7, 1897.)
(No Model.) 11 Sheets—Sheet 4.

WITNESSES:
Jules T. Metzger
T. J. Hogan.

INVENTOR
Chauncey N. Dutton,
by J. Snowden Bell,
atty

No. 621,470. Patented Mar. 21, 1899.
C. N. DUTTON.
AQUEDUCT.
(Application filed Oct. 7, 1897.)

(No Model.) 11 Sheets—Sheet 5.

WITNESSES:
Jules T. Metzger
T. J. Hogan.

INVENTOR
Chauncey N. Dutton.
by J. Snowden Bell
Atty.

No. 621,470. Patented Mar. 21, 1899.
C. N. DUTTON.
AQUEDUCT.
(Application filed Oct. 7, 1897.)
(No Model.) 11 Sheets—Sheet 7.

WITNESSES:
Jules T. Metzger
T. J. Hogan.

INVENTOR
Chauncey N. Dutton,
by J. Snowden Bell,
atty.

No. 621,470. Patented Mar. 21, 1899.
C. N. DUTTON.
AQUEDUCT.
(Application filed Oct. 7, 1897.)
(No Model.) 11 Sheets—Sheet 8.

No. 621,470. Patented Mar. 21, 1899.
C. N. DUTTON.
AQUEDUCT.
(Application filed Oct. 7, 1897.)
(No Model.) 11 Sheets—Sheet 10.

UNITED STATES PATENT OFFICE.

CHAUNCEY N. DUTTON, OF NEW YORK, N. Y.

AQUEDUCT.

SPECIFICATION forming part of Letters Patent No. 621,470, dated March 21, 1899.

Application filed October 7, 1897. Serial No. 654,341. (No model.)

*To all whom it may concern:*

Be it known that I, CHAUNCEY N. DUTTON, of the city, county, and State of New York, have invented a certain new and useful Improvement in Aqueducts, of which improvement the following is a specification.

My invention specially relates to aqueducts constructed of metal; and its object is to provide an aqueduct in which the forces acting upon it shall be balanced one against another, so as to reduce the strains and the moments which they produce on the structure, thereby enabling the construction to be lightened and its cost correspondingly reduced without impairment of its strength.

The improvement claimed is hereinafter fully set forth.

In aqueducts designed for the passage of vessels the members are under my invention loaded in such a manner that the blows struck by the vessels upon the walls of the aqueduct act in opposition to the static load or deadweight thereon, so that the resulting strain is the difference between strains due to static load and those due to impact.

In aqueducts of the character of those heretofore designed and constructed the impact acts in addition to the static load and adds to the strain, so that the maximum strains in the structure are the sum of the dead and live load strains, whereas under my invention they are the difference between these strains, or it may be that the static strain is the maximum strain and the impact of the vessel merely reduces the strain. In order to accomplish these results, the mode of applying the static load in one case and the mode of supporting the structure in another case are so designed that the static load induces compression in the inner flange members of the frames and tension in the outer flange members, and the impact or blow induces tension in the inner flange members and compression in the outer flange members, these strains being opposite in nature and the result of the two combined being their algebraic sum. In cases where the impact is less than the static strain the resultant is less than the static strain and where the impact is greater it causes reversal of strains, and in the most economical structures the result of the combined static load and impact are strains equal to and reverse in nature from those due to the static load alone. In this case it will be seen that the strength necessarily provided in the structure is sufficient to resist one-half of the blow, whereas in structures of prior designs it is equal to the sum of the blow and the static load. Further, inasmuch as the strain resulting from the blow is a function of the distance through which the opposing force is moved, and in this case the opposing member moves from its extreme tension to its extreme compression, whereas in the ordinary constructions the movement is due only to a modicum—as, say, one-half of the tension or of the compression, as may be—it will be obvious that the yielding of the structure which cushions the blow is through four times the distance that it is in structures of ordinary design and that the flange strain is less than one-eighth.

In the accompanying drawings, Figs. 5 to 14, inclusive, illustrate an aqueduct designed for the passage of vessels and having its bays constructed in accordance with the principles diagrammatically indicated in Fig. 2. Figs. 15 to 26, inclusive, illustrate the end bay of an aqueduct constructed in accordance with the modification diagrammatically indicated in Fig. 4. Figs. 27 to 31, inclusive, illustrate a wide aqueduct having a suspended floor in sections and the mode of providing for the expansion and contraction of the same.

Figure 1:
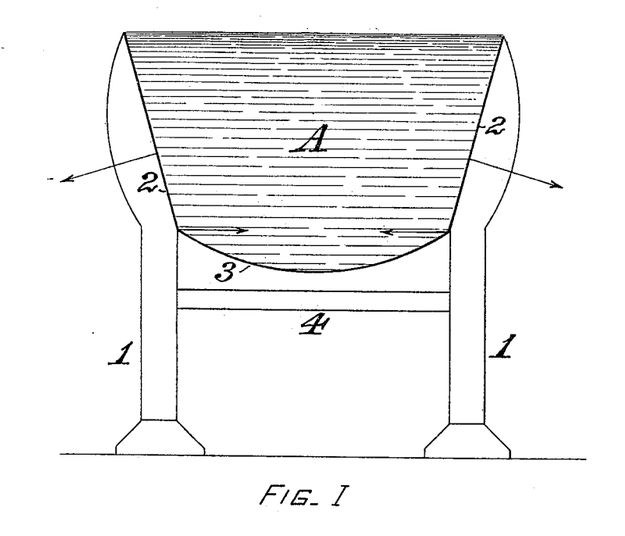
Figure 1 is a diagrammatic transverse section through an aqueduct, illustrating an application of my invention, the aqueduct having a suspended floor resting upon columns and not being designed for the passage of boats.

The essential and governing principle of the simplest form of aqueduct embodying my invention is indicated diagrammatically in Fig. 1. This is not designed for the reception of vessels, and therefore the static forces can be normally in perfect equilibrium. To obtain this equilibrium, the aqueduct $A$ rests upon and is sustained by supports 1 and is provided with side walls 2 and a suspended floor 3, which is attached at its edges to the side walls and the supports. The floor being entirely without framing hangs in a curve of equilibrium and exerts an inward pull in the direction of the arrows upon the side walls and supports at its points of attachment thereto. The water passing through the aqueduct naturally exerts pressure upon the side walls, tending to turn them outward, and the parts are so proportioned that the moment of the tension of the floor is in equilibrium with the moment of the hydrostatic pressure upon the side walls. Were it possible to maintain the water in the aqueduct at an absolute level and to protect the aqueduct from all extraneous forces, no other members would be necessary; but in the practical use of any aqueduct it is necessary to provide a margin of stability. I therefore provide a stay 4, connecting the supports, so that the equilibrium may be disturbed within any necessary margin of stability without disturbing the structure.

In the remaining figures there are illustrated aqueducts adapted for the traverse of vessels, in which structures provision is necessarily made for the impact of the vessels upon the side walls. In the form shown in diagram in Fig. 2 the aqueduct $A'$ is supported by frames $1^u$, which are of U form and may be supported on columns or pedestals $1^a$. Inasmuch as in this form of aqueduct the side walls are liable to occasional blows from contact of vessels, the greatest economy of structure is obtained by so proportioning the members that the strains due to the static moments are opposite in character or direction and nearly equal in amount to those induced by the blow. To this end the floor is suspended as in the previous case and the frames are made in U shape, the vertical arms being connected by a transverse member beneath the floor and the inner and outer flanges of the frame being continuous entirely around the U.

Figure 2:
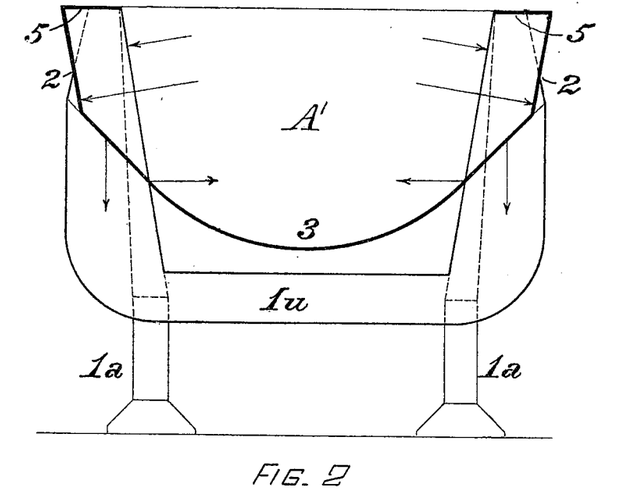
Fig. 2, a similar section, the aqueduct being designed for the passage of boats.

The side walls 2 are preferably segments of cylinders in plan and, with the chord members 5 and the stiffened junction of the walls 2 with the floor-plates 3, as hereinafter described, form longitudinal girders, supporting the floor and imposing the load thereof on the frames. The most economical proportion is such that the inward moment of the load exerted through the floor at its points of attachment to the side walls and frames tends to revolve the vertical arms of the frames inwardly in opposition to the moments of the hydrostatic pressure on the side walls and the weights of the overhanging parts of the structure and of the load. The inward moment of the floor exceeds the outward moments above referred to in such manner as to induce tension upon the outer flanges of the vertical arms and the lower flange of the U-frames and compression on the inner and upper flanges thereof, and this moment is of such amount that when the greatest possible blow is struck by vessels navigating the aqueduct the sum of the outward moments, including the moment of the blow, exceeds the inward moment of the floor, so that the strain in the outer and lower flanges is reversed and becomes a compressive strain equal in amount to the tensile strain induced by the static load alone. The result of this construction is a reduction of the metal required in the outer and lower flanges of the frames to about one-eighth of the amount necessary in ordinary constructions. The reason for this great economy is that the living force of the blow induces a strain in the member opposing and cushioning it by yielding to it, which strain is directly proportioned to the distance through which the opposing member moves.

In aqueducts as heretofore constructed the inner and upper flanges of the frames are normally in tension and the outer and lower flanges in compression, due to the static load, and the sides are deflected outwardly thereby, and when the blow is struck the side which is struck is further deflected in the same direction, and the strains are of the same kind and are added to those previously existing, due to the static load. Further, the static load has already deflected these members through a considerable part of the distance through which they can yield without rupture. The destructive effort therefore is equal to the sum of the static and impact moments, and the yielding or cushioning effect, which is that which saves the structure from destruction, is reduced to the difference between the static deflection and the maximum deflection.

In the aqueduct herein set forth the sides are deflected inwardly by the static load and outwardly by the blow, and the destructive force is the difference between the static and impact moments, and the preservative action—i. e., the elasticity which cushions the blow—is equal to the sum of the deflections due to the greatest compression and tension which the members can sustain without injury.

Figure 3:
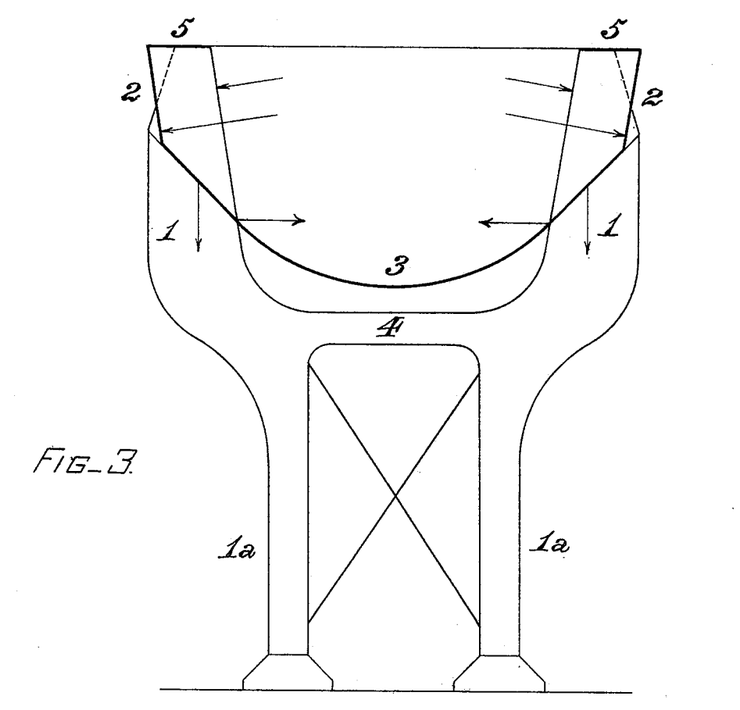
Fig. 3, a similar section illustrating a modification of the construction of Fig. 2.

Fig. 3 illustrates diagrammatically an application of the same principle as embodied in Fig. 2 under a variation of form. In many cases the transverse portion of the U-frame of Fig. 2 would involve a waste of material, as one of the strains, either the tensile or the compressive strain, could be carried down to the foundation and be absorbed or retained by the earth or the stability of the foundation. To accomplish this, the columns or posts $1^a$ are set out of line with the side walls and the vertical parts 1 of the frame, so that the load exerts a moment around the axes of the columns, and by varying the amount and direction of this overhang and the amount and direction of the moment the amount and character of the strains in the transverse member 4 can be changed. As shown in Fig. 3, the posts $1^a$ are set in toward the center and the frames overhang and tend to rotate the posts outward and to force their feet inward, thus inducing tension on the stay 4. The inward thrust at the toes of the posts $1^a$ is resisted by the foundation. It will be seen that this construction constitutes a modified form of the U-frame $1^n$ of Fig. 2, the earth being considered the bottom flange. It will also be obvious to the engineer that were the posts to be set out beyond the lines of the side walls the load would tend to revolve the posts inward and thrust their toes outward and the stay 4 would be in compression, and, further, that the principle of balancing one force against another, which is the underlying principle of the invention, is capable of being modified to vary the amount and character of the flange strains and attain the greatest economy consistent with the practical service of the aqueduct.

Figure 4:
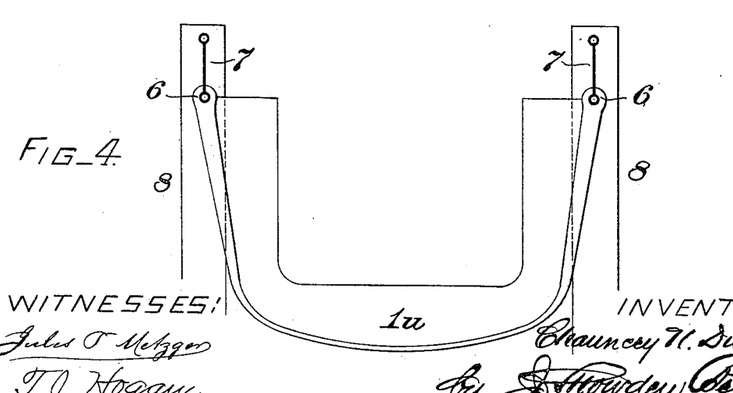
Fig. 4, a similar section showing the aqueduct suspended on links and having a flat-framed floor suspended to the side walls.
Figure 5:
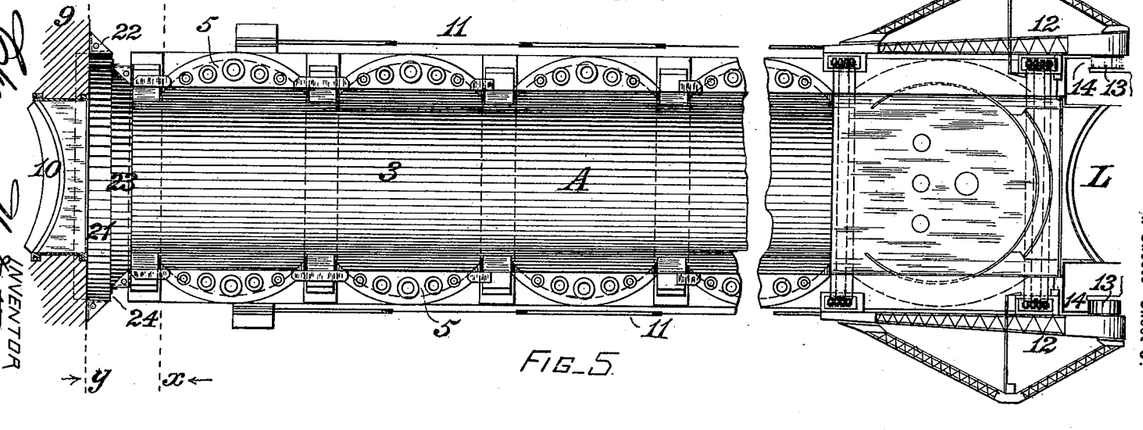
Fig. 5 is a plan or top view.

The above-described forms of aqueduct are, as shown, provided with suspended floors. In many cases the curved form of suspended floor which is illustrated would be undesirable, and I therefore also provide the type shown diagrammatically in Fig. 4. In this form the frame $1^n$ is U-shaped and the outer flange is provided with eyes or points of support 6, from which the frame can be suspended by links 7 or otherwise upon a suitable support or supports 8. In this form the static load induces tension in the outer and compression in the inner flanges, and the impact tends to induce strains of opposite character. This form of construction will be found even more efficient in practice than that shown in the preceding figures. In those forms the impact deflects one side only of the U-frame and is opposed by the elasticity of one side or half of the structure, while in this form a blow upon either side acts upon both sides and calls into action the elasticity of the entire structure.

Figs. 5 to 14, inclusive, illustrate an aqueduct constructed upon the principles above set forth, the same being designed to connect a canal or other waterway with a lift-lock L.

One end of the aqueduct is connected to the end wall 9 of the canal, the opening of which is controlled by a gate 10, and the outboard end is gated and adapted to connect with the lock L. In order to sustain the hydrostatic pressure in the outboard end of the aqueduct or in the lock, as may be, when the lock is connected to the aqueduct, and at the same time to provide sufficient elasticity, so that the accidental ramming of a boat may not cripple or carry out the end, I provide a tension anchorage, the tension of which is automatically maintained and adjusted, and which consists in a chain or chains 11, preferably one on each side of the aqueduct. The ground end of the anchorage is suitably secured to a proper foundation and the outer end is connected to the aqueduct. The chain hangs in a curve, and, if desired, it may be weighted, although in the design shown the bars composing the chain are sufficiently heavy. Frames 12 are connected to and extend outwardly from the anchorages beyond the face of the aqueduct, said frames being designed to hold the lock in proper relation to the aqueduct by the engagement of wheels 13 on the frames with projecting shoulders 14 on the lock-body.

The structure of the intermediate bays or sections of the aqueduct is constructed upon the principles elucidated in the description of Fig. 2 and is illustrated in detail in Figs. 7 to 14, inclusive. The U-frames $1^n$ are supported on columns or pedestals $1^a$, and in order to facilitate bringing the load central upon the columns the sides are inclined outward, so that the axes of the columns when projected vertically cut nearly central through the lines where the longitudinal trusses formed of the side walls 2 connect to the U-frames.

The bearing-plates 15, attached to the U-frames 1ᵘ for supporting them upon the columns, are preferably located centrally in the horizontal portions of the frames 1ᵘ, so that the flanges are not in contact with the columns and their computation is not complicated with the bending of the column. The connection of the curved floor with the vertical arms of the frames is preferably made by plates 16, which are riveted to the lower sections of the frames 1ᵘ, forming a kind of cantaliver, to which the floor-plates are connected and which transfers the strain therein to the frame. The line of junction of the side walls 2 with the floor-plates is reinforced, if necessary, by angles or plates 17, and the upper portion of the curved side-wall plates are distended and held in place by chord-plates 5, stiffened by rings 19, and similar plates 5ᵃ are located below the plates 5, the plates also furnishing support to buffers 20 to diminish the effect of the shock of impact of vessels. It will be observed that these buffers are in the form of timber grills and that wherever practicable the point of support of one member of the grill is intermediate between or out of line with the points of support of the contiguous members, so as to develop the greatest elasticity, due to the fact that all the members of the grill have to bend before delivering the full stress upon the aqueduct structure In order to make and maintain a tight joint between the aqueduct and the masonry head wall 9 of the canal, a plate 21 is laid into the concrete of said wall, the part laid into the concrete being perforated, so that the concrete will bind through the perforations and keep the plate in position. The upper part of the plate is stiffened by brackets 22. The lower part may be semicircular and not require stiffening. A concentric plate 23 is connected with the aqueduct, and the edges of the plates 21 and 23 are connected by a plate 24, so that as the aqueduct expands and contracts the plate 24 buckles and permits the motion of the aqueduct without breaking joints.

The outboard end bay of the aqueduct necessarily accommodates the gate thereto and preferably has a flat floor. The frames of the outboard end bay are therefore of the type illustrated in Fig. 4.

Figure 7:
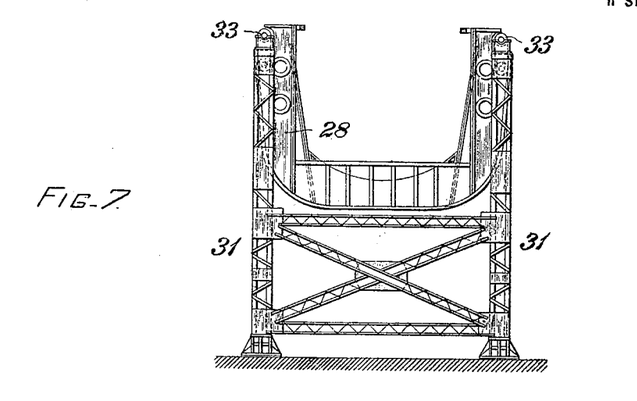
Fig. 7, a front end view.
Figure 8:
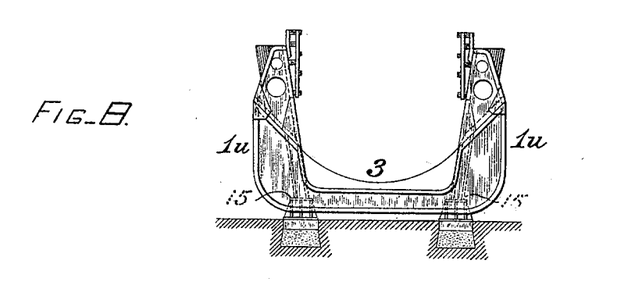
Fig. 8, a transverse section on the line $x\,x$ of Fig. 6.
Figure 9:
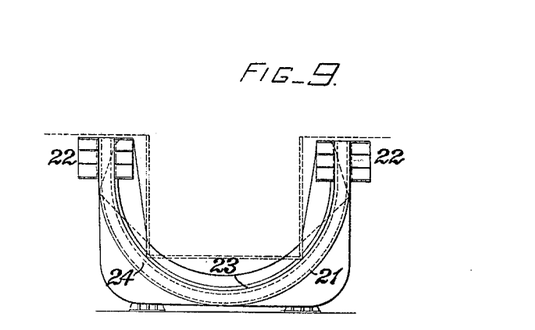
Fig. 9, a similar section on the line $y\,y$ of Fig. 6.
Figure 10:
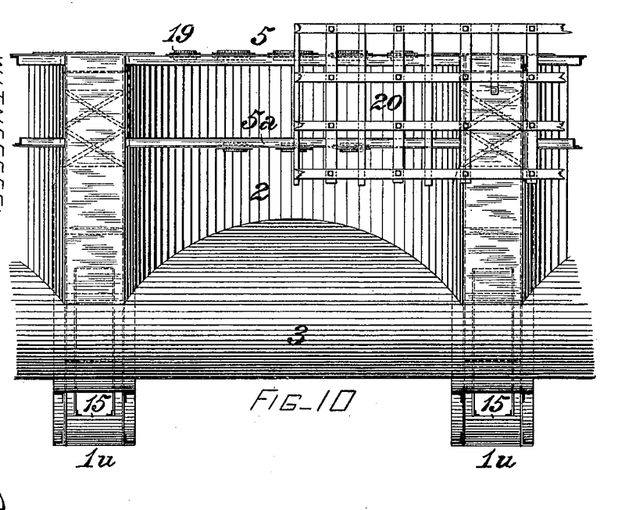
Fig. 10, a vertical longitudinal central section through one of the bays.
Figure 11:
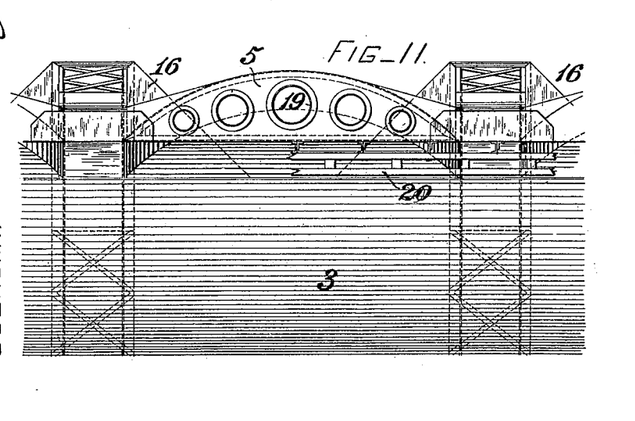
Fig. 11, a half-plan view of the same.
Figure 12:
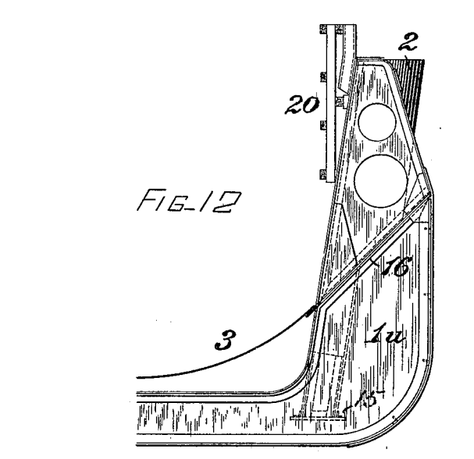
Fig. 12, a view, on an enlarged scale, of a portion of one of the transverse frames.
Figures 13, 14:
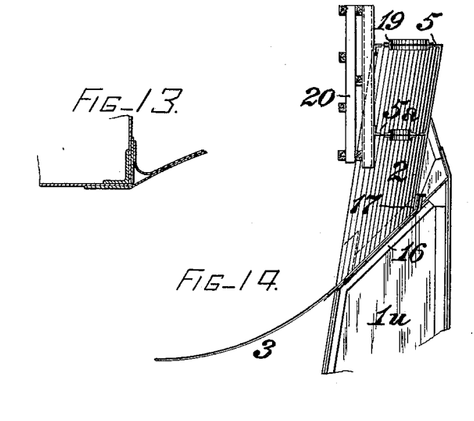
Fig. 13, a sectional view, on an enlarged scale, showing the junction of a wall of a bay and a frame.
Fig. 14, a partial transverse section, on an enlarged scale, through the center of a side wall of a bay.

Fig. 7 shows the elevation of the end frame and the columns on which it is suspended.

Figure 15:
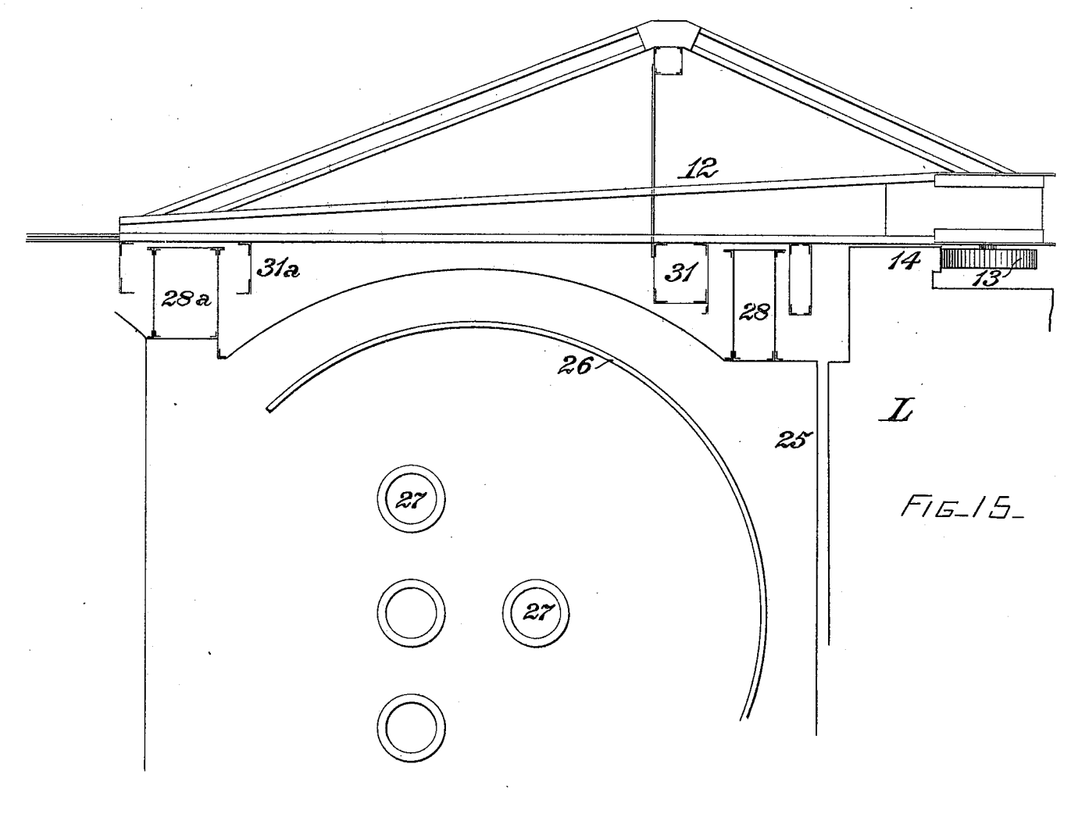
Fig. 15 is an enlarged plan view of the end of the aqueduct shown in Figs. 5 and 6 and having the suspended frames of Fig. 4.
Figure 16:
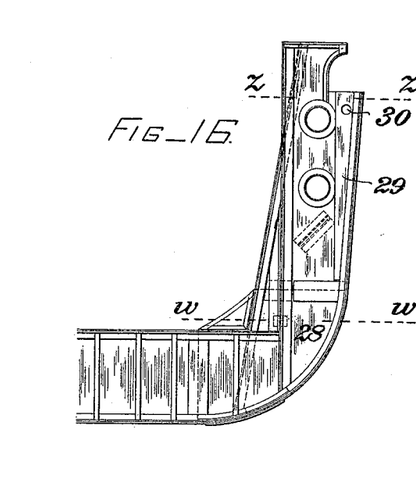
Figs. 16 and 17 are side views of the inner suspended frame of Fig. 15.
Figure 17:
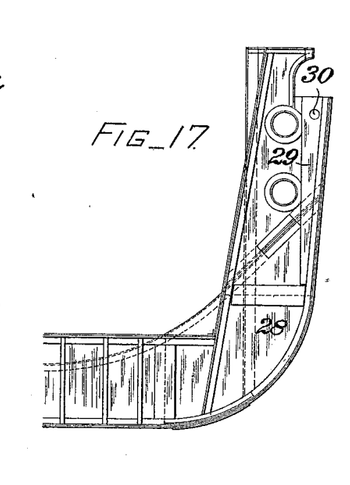
Figure 18:
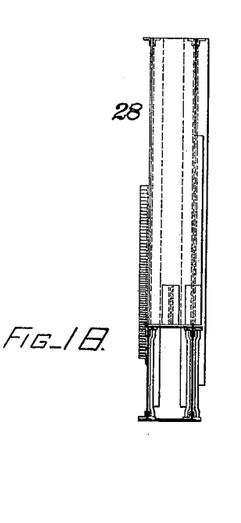
Fig. 18, a central transverse section through the same.
Figure 19:
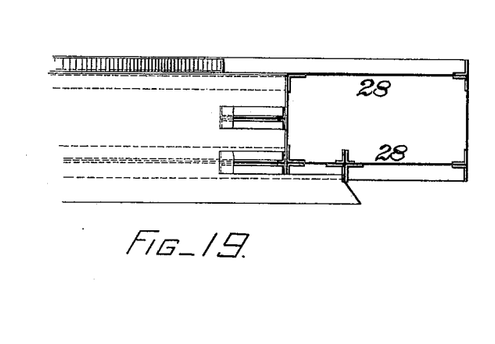
Figs. 19 and 20, horizontal sections through one of the vertical arms of a frame at the lines $w\ w$ and $z\ z$, respectively, of Fig. 16.
Figure 20:
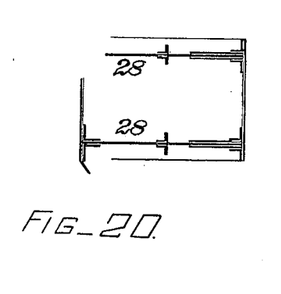
Figure 21:
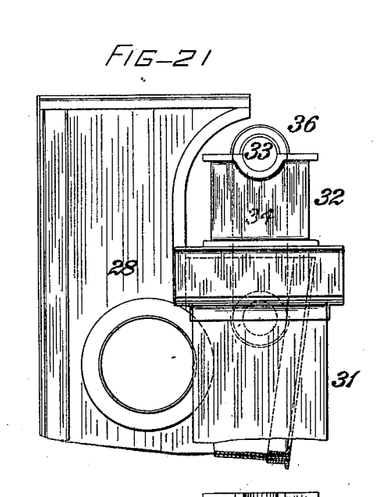
Fig. 21, a view on a plane transverse to the aqueduct.
Figure 22:
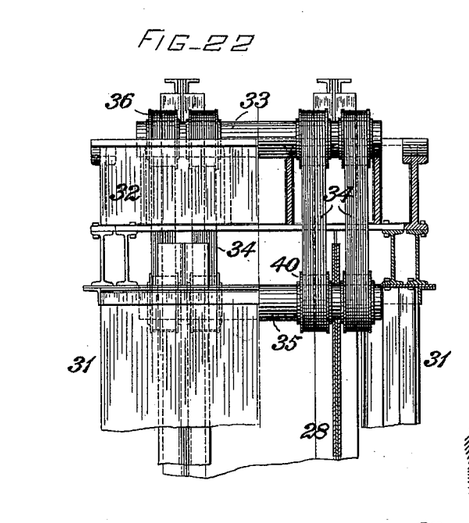
Fig. 22, a view, partly in section, on a plane parallel with the aqueduct, illustrating the mode of suspending the frame of Figs. 15 to 17.
Figure 23:
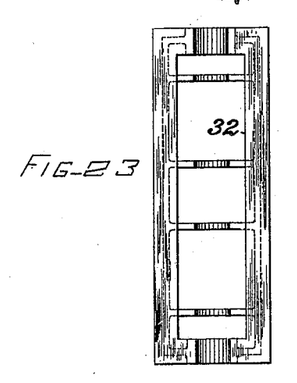
Fig. 23, a plan view of the cap of the column which affords direct support to the frame-suspending pin.
Figure 24:
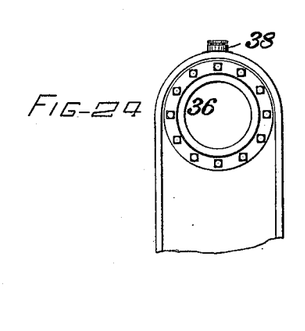
Figs. 24, 25, and 26 are detailed views of portions of the suspending-links.
Figure 25:
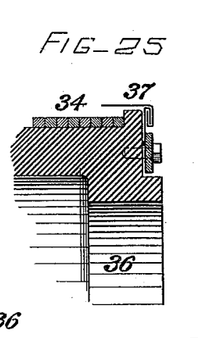
Figure 26:
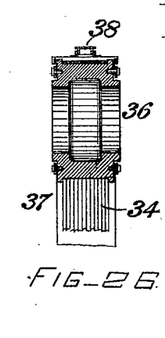
Figure 27:
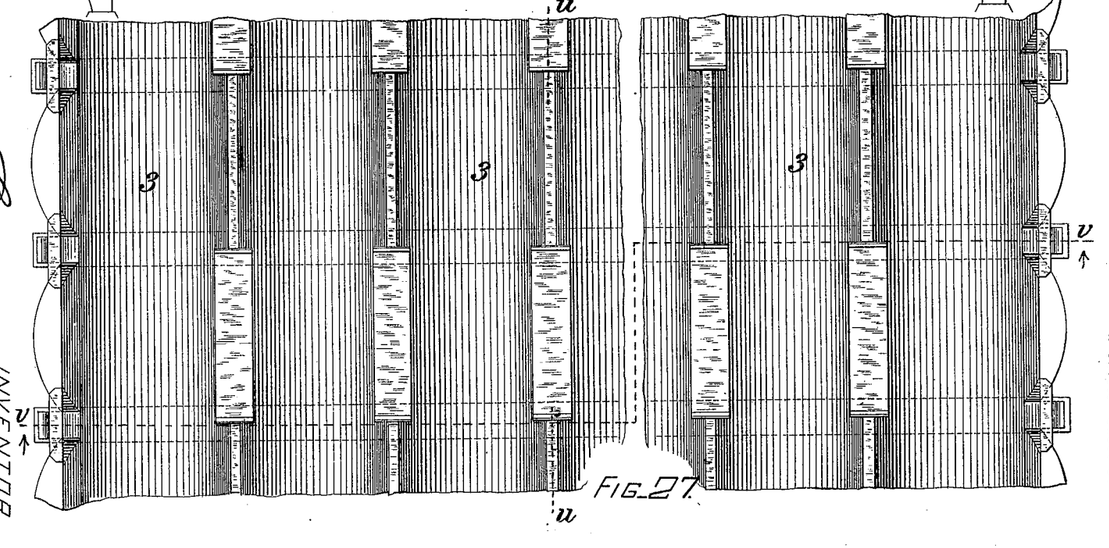
Fig. 27 is a plan view of a portion of the aqueduct.
Figure 28:
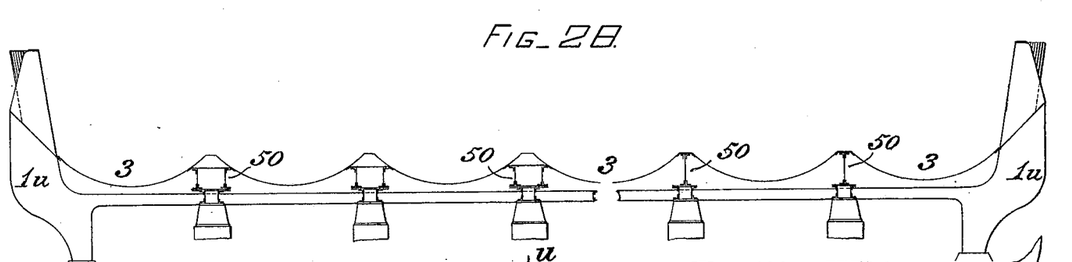
Fig. 28, a transverse section of the same on the broken line $v\ v$ of Fig. 27.

Fig. 15 shows the end bay in plan. Communication with the lock L is effected through an opening 25, controlled by a suitable gate, which runs on a track 26. Flanged pipe-openings 27 are formed in the aqueduct-floor and the end bay is supported on an outboard-frame 28 and an inner frame 28ᵃ.

The details of the constructions of the frames are shown in Figs. 16 to 20, inclusive. The frames are of the box-girder type with web-plates 28, outer and inner flanges, and outer suspending-plates 29, with pin-holes 30, by which the frames are suspended on the supporting-columns 31 31ᵃ, the suspending-link and its supports on the column being shown in Figs. 21 to 26, inclusive. The supporting-columns 31 31ᵃ are built hollow, enveloping the outer parts of the frames 28 28ᵃ, and are provided with upper pin-frames 32, supporting pins 33, which carry links 34, preferably made of steel wire and connecting the pins 33 with pins 35, passing through the pin-holes 30 of the frames 28 28ᵃ, so that the frames can move without turning the links on the pins, the motion being accomplished by flexure of the wires forming the links. The wires are wound around spools 36 and 40 on the pins 33 and 35 and are incased in air and water tight envelops of galvanized iron 37, provided with capped oil-passages 38. The inner columns 31ᵃ are preferably mounted on pin-bearings 39. The outer columns 31 should be anchored down and the columns should be braced together longitudinally and transversely by ties 41, so that they may resist the pull of the anchorage 11 when the aqueduct is dry.

Figure 29:
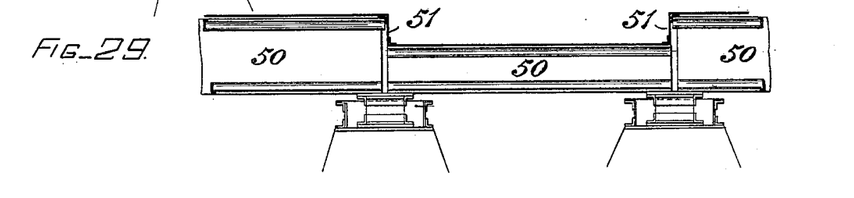
Fig. 29, a sectional view on the line $u\ u$ of Fig. 27.
Figures 30, 31:
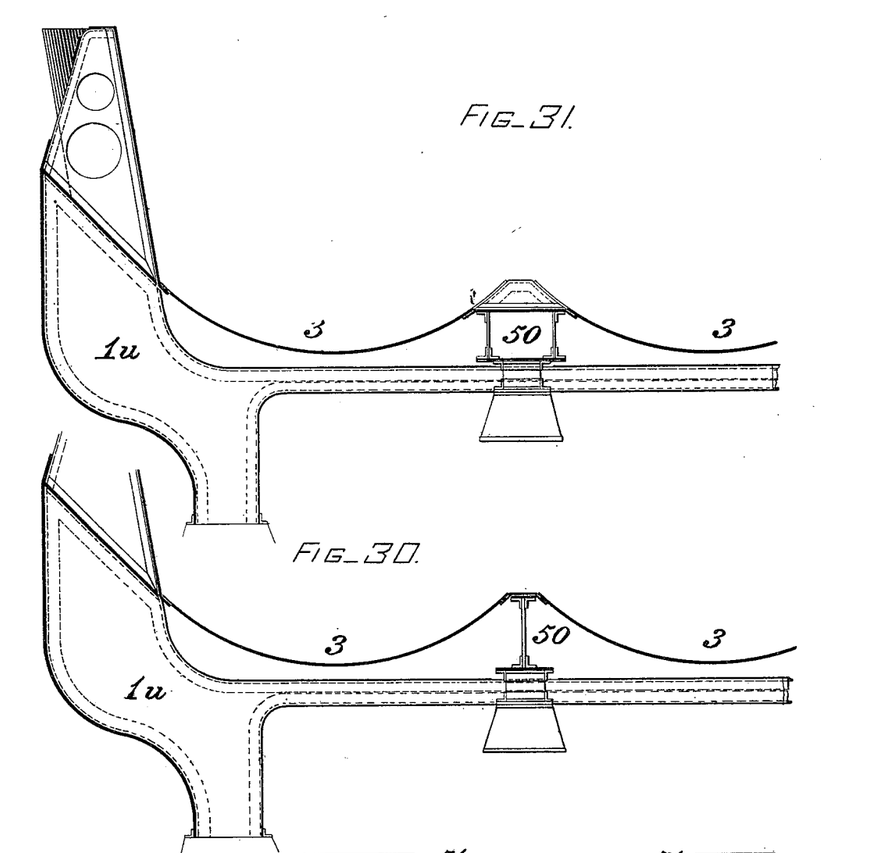
Figs. 30 and 31, transverse sectional views, on an enlarged scale, showing the provision for longitudinal expansion in the intermediate supports of the floor.

Figs. 27 to 31, inclusive, show a modification of the aqueduct-floor preferably used in wide aqueducts, in which case the suspended floor if made in one curve would too greatly increase the weight upon the floor and its pull upon the frames. In this construction longitudinal girders 50 are interposed, subdividing the floor into a number of transverse bays. To provide for the longitudinal expansion and contraction of the floor, these girders are alternately higher and lower and spaced some distance apart at their ends, as shown in Fig. 29, and the spandrels 51, formed between the plates covering the lower girders and those covering the higher girders and the floor-plates, are closed by vertical transverse plates 51, the buckling and flexure of which, together with the buckling and flexure of the floor-plates in their unsupported parts, will permit temperature strains to take place without injurious strains.

Figure 6:
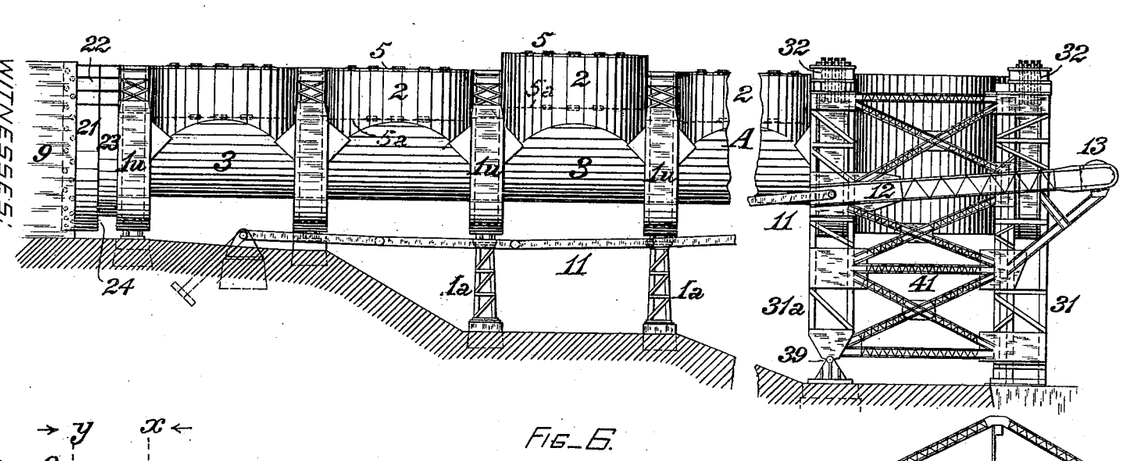
Fig. 6, a side view in elevation.

Fig. 6 shows a type of construction for relieving temperature strains in the side walls of the aqueducts. In certain of the bays the side walls are, as shown at the middle portion of the figure, raised, and the chord and stiffening plates 5 and 5ᵃ are out of line with the similar plates in the adjacent bays, so that expansion and contraction can take place without injurious effects, producing merely bending of the side plates of the frames. The connection of the side walls with the floor-plates being in arch form cannot be overstrained.

Figure 32:
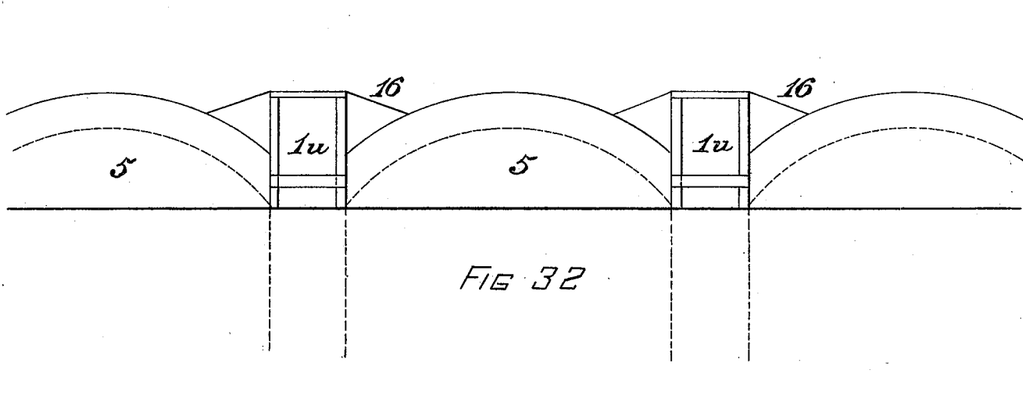
Figs. 32 and 33, diagrammatic views illustrating a modification of the manner of connecting the side walls of an aqueduct constructed in accordance with Fig. 2 with the supporting-frames in order to minimize the destructive effects of impact and temperature changes.
Figure 33:
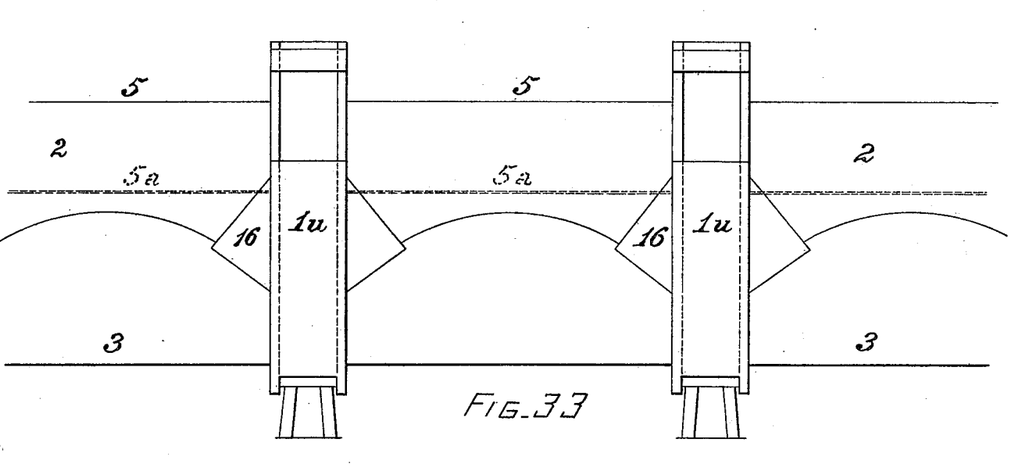

In Figs. 32 and 33 a modified form of construction to provide for temperature changes is shown. In this form the walls of the bays are all similar and the chord and stiffening plates 5 5ᵃ are riveted to the side plates of the frames 1ᵘ, and the frames extend upwardly above the chord-plates 5 and have chord-plates at their tops only, their bottoms being united to the cantaliver-plates 16, thus forming them into square members, which act both as columns and as shafts, the blow of the vessel causing a combined bending and torsion and temperature strains in the chord-plates 5 and 5ᵃ inducing bending of the side plates of the frames.

The downward effort of the load carried by the aqueduct-floor is imposed upon the frames 1ᵘ by the attachment thereto of the longitudinal girders formed of the side walls and the chord-plates 5 5ᵃ and the arch or stiffened junction 17 of the floor-plate and side walls of the aqueduct. This mode of imposing the weight upon the columnar upright members of the frames 1ᵘ tends to cause compressive strains on the inner side thereof in opposition to and neutralizing the tensile strains which would otherwise be caused there by the hydrostatic pressure on the sides of the aqueduct.

I claim as my invention and desire to secure by Letters Patent—

1. In an aqueduct, the combination of supports or frames, side walls, and a floor, these members being disposed and connected, substantially as set forth, so that the moments due to the weight carried by the floor shall be inward.

2. In an aqueduct, the combination of supports, side walls connected thereto, and a suspended floor, which exerts an inward pull upon the supports.

3. In an aqueduct, the combination of supports, side walls connected thereto, and a suspended floor divided transversely into two or more connected sections, the outer of which are attached at their edges to the side walls.

4. In an aqueduct, the combination of supports, transverse stays connecting said supports, side walls connected to the supports, and a suspended floor.

5. In an aqueduct, the combination of supports or pedestals, transverse frames of U form, side walls connected to the transverse frames, and a suspended floor.

6. In an aqueduct, the combination of supports or pedestals, transverse frames of U form, having their vertical arms out of line with the supports, side walls connected to the transverse frames, and a suspended floor.

7. In an aqueduct, the combination of supports or pedestals, transverse frames of U form, links suspending said frames to the supports, side walls connected to the transverse frames, and a suspended floor.

8. In an aqueduct, the combination of supports, side walls connected thereto, longitudinal chord members connected to the side walls, and a suspended floor attached at its edges to the side walls.

9. In an aqueduct, the combination of supports or pedestals, transverse frames of U form having outwardly-inclined upward arms, side walls connected to the transverse frames, and a suspended floor attached at its edges to the side walls.

10. In an aqueduct, the combination of supports or pedestals, transverse frames of U form, curved side walls connected to the transverse frames, chord-plates connected to the side plates, and a suspended floor attached at its edges to the side walls.

11. In an aqueduct, the combination of supports or pedestals, transverse frames of U form, curved side walls connected to the transverse frames, chord-plates connected to the side plates, impact-buffers connected to and supported by the chord-plates, and a suspended floor.

12. In an aqueduct, the combination of supports or pedestals, transverse frames of U form, curved side walls connected to the transverse frames, chord-plates connected to the side plates, impact-buffers formed of timber grills connected to and supported by the chord-plates, and a suspended floor.

13. In an aqueduct, the combination of supports or pedestals, transverse frames of U form, side walls connected to the transverse frames, a curved suspended floor attached at its edges to the side walls, and cantaliver-plates connecting the plates of the floor to the transverse frames.

14. In an aqueduct, the combination of supports, side walls connected thereto, a suspended floor divided transversely into two or more connected sections, the outer of which are attached at their edges to the side walls, longitudinal girders which are alternately higher and lower, interposed between the transverse sections of the floor, and vertical transverse plates covering the spandrels between the plates covering the lower girders and those covering the higher girders and the floor-plates.

15. In an aqueduct, the combination of supports or pedestals, transverse frames of U form, side walls connected to the transverse frames and alternately higher and lower in adjacent bays, and longitudinal chord members connected to the side walls, at different levels respectively in adjacent bays.

16. In an aqueduct, the combination of a floor, side walls, and frames of box or tubular section having end chord-plates, the upper ends and chord-plates extending above the side walls, which are connected to said frames.

17. In combination with an aqueduct, an anchorage connected to a fixed foundation and to a member of the aqueduct structure, and exerting a positive inward pull.

18. In combination with an aqueduct, a positive tension-anchorage, having a fixed foundation, and a curved suspended cable attached at one end to the anchorage, and at the other to the aqueduct.

19. In an aqueduct, the combination of supporting-columns, a tension-anchorage connected to said columns and to a fixed foundation, transverse frames of U form, links by which said frames are suspended from pins on the columns, and side walls and a suspended floor attached to said frames.

20. In an aqueduct, the combination of a tension-anchorage, frames connected to said anchorage, and wheels having bearings on said frames, and adapted to engage with projections on a movable locking member.

CHAUNCEY N. DUTTON.

Witnesses:
PAUL SEUROT,
F. N. GLEASON.